US012665311B1

(12) United States Patent
Smolyaninov et al.

(10) Patent No.: US 12,665,311 B1
(45) Date of Patent: Jun. 23, 2026

(54) HYBRID ANTENNA WITH DYNAMIC SIGNAL ROUTING FOR FREE-SPACE AND NEAR-METAL ENVIRONMENTS

(71) Applicant: Saltenna Inc., McLean, VA (US)

(72) Inventors: Igor Smolyaninov, Columbia, MD (US); Quirino Balzano, Annapolis, MD (US)

(73) Assignee: Saltenna Inc., McLean, VA (US)

( * ) Notice: Subject to any disclaimer, the term of this patent is extended or adjusted under 35 U.S.C. 154(b) by 0 days.

(21) Appl. No.: 19/134,642

(22) PCT Filed: Feb. 11, 2025

(86) PCT No.: PCT/US2025/015358
§ 371 (c)(1),
(2) Date: May 30, 2025

(51) Int. Cl.
*H01Q 11/08* (2006.01)
*H01Q 1/50* (2006.01)

(52) U.S. Cl.
CPC ............... *H01Q 11/08* (2013.01); *H01Q 1/50* (2013.01)

(58) Field of Classification Search
CPC ................................. H01Q 11/08; H01Q 1/50
See application file for complete search history.

(56) References Cited

U.S. PATENT DOCUMENTS 3,315,264 A * 4/1967 Brueckmann ............ H01Q 9/30 343/822
3,573,840 A * 4/1971 Gouillou .................. H01Q 1/38 343/843
4,504,834 A * 3/1985 Garay ...................... H01Q 9/32 343/792
4,661,992 A * 4/1987 Garay .................. H04B 1/3877 455/90.3
4,772,895 A * 9/1988 Garay .................... H01Q 1/362 343/895
4,800,395 A * 1/1989 Balzano ................. H01Q 1/362 343/790
5,528,254 A * 6/1996 Howng .................... H01Q 1/40 343/753

(Continued)

FOREIGN PATENT DOCUMENTS

WO 2007011191 1/2007

OTHER PUBLICATIONS

PCT International Search Report and Written Opinion for Application No. PCT US25/15358 Mailed May 2, 2025 (11 Pages).

*Primary Examiner* — Dimary S Lopez Cruz
*Assistant Examiner* — Bamidele A Immanuel
(74) *Attorney, Agent, or Firm* — Esplin & Associates, PC

(57) ABSTRACT

Hybrid antenna structures for seamless integration of free space and surface electromagnetic wave (SEW) radiation are described. In some examples, the hybrid antenna may comprise a helical antenna free space radiator coupled to an SEW antenna feed point. The system may include a radio frequency switch and reflectometers configured to sense impedance at the helical antenna and SEW feed point, dynamically routing signals based on the sensed impedance. A free space radiation feed line and an SEW radiation feed line may be connected to the radio frequency switch and reflectometers, enabling efficient operation in varying environments. This configuration may allow the antenna to function as a conventional free space radiator or a plasmonic surface wave antenna, optimizing performance without user intervention.

20 Claims, 10 Drawing Sheets

(56) References Cited

U.S. PATENT DOCUMENTS

| | | | | |
|---|---|---|---|---|
| 5,563,615 | A * | 10/1996 | Tay | H01Q 5/335 343/792 |
| 7,609,226 | B1 * | 10/2009 | MacGahan | H01Q 11/08 343/846 |
| 2004/0201531 | A1 * | 10/2004 | Fujimura | H01Q 1/362 343/895 |
| 2008/0106485 | A1 * | 5/2008 | Huang | H01Q 1/242 343/895 |
| 2008/0153416 | A1 * | 6/2008 | Washiro | H01P 3/16 455/41.1 |
| 2011/0193755 | A1 * | 8/2011 | Lindenmeier | H01Q 1/3275 343/715 |
| 2011/0215984 | A1 * | 9/2011 | Coburn | H01Q 11/08 343/895 |
| 2018/0090830 | A1 * | 3/2018 | Mcmichael | H01Q 9/145 |
| 2018/0156906 | A1 * | 6/2018 | Bennett | G01S 13/04 |
| 2018/0159235 | A1 * | 6/2018 | Wolniansky | H01Q 1/48 |
| 2018/0219280 | A1 * | 8/2018 | Fedan | H01Q 1/3291 |
| 2019/0027833 | A1 | 1/2019 | Ayala Vazquez | |
| 2019/0089061 | A1 | 3/2019 | Parsche | |
| 2019/0261192 | A1 | 8/2019 | Rappaport | |
| 2021/0328353 | A1 * | 10/2021 | Smolyaninov | H04W 16/26 |

* cited by examiner

HYBRID ANTENNA WITH DYNAMIC SIGNAL ROUTING FOR FREE-SPACE AND NEAR-METAL ENVIRONMENTS

FIELD OF TECHNOLGOY

The present disclosure relates generally to communications technologies, and more specifically to hybrid antenna with dynamic signal routing for free-space and near-metal environments.

BACKGROUND

Antennas are widely used in the field of wireless communication to transmit and receive electromagnetic signals. Conventional antennas, such as dipole and helical designs, may operate effectively in free-space conditions, where they radiate signals efficiently. The design and operation of antennas may involve considerations such as impedance matching, signal propagation, and the interaction of electromagnetic waves with surrounding materials.

SUMMARY

The described implementations relate to improved communications technologies and associated methods for hybrid antenna with dynamic signal routing for free-space and near-metal environments. In some examples, the hybrid antenna structure may integrate a conventional free-space radiator and a plasmonic surface wave antenna into a single system. This hybrid design may incorporate impedance sensing, reflectometers, and a radio frequency switch to dynamically route signals to the appropriate antenna port based on environmental conditions. By measuring the reflection coefficients at the feed points of both the conventional and plasmonic antennas, the system may determine the optimal antenna to use for a given situation. The radio frequency switch may then direct the signal to the antenna with the lower reflection coefficient, ensuring efficient operation in both free-space and near-metal environments.

The hybrid antenna structure may feature a resonant helical antenna for free-space radiation and a plasmonic antenna for near-metal operation. The helical antenna may be designed with feed points at different impedance locations, allowing it to function effectively in free-space conditions. The plasmonic antenna, on the other hand, may be optimized for surface electromagnetic wave (SEW) propagation near metallic surfaces. The integration of these two antenna types, along with the dynamic switching mechanism, may provide a versatile and efficient solution for wireless communication in diverse environments. This innovative approach may ensure that the antenna system can maintain high performance and reliability, regardless of the surrounding conditions.

A hybrid antenna structure is described. The structure may include a helical antenna free space radiator. The structure may include an SEW antenna feed point coupled to the helical antenna free space radiator. The structure may include an RF switch and reflectometers configured to sense impedance at the helical antenna free space radiator and the SEW antenna feed point. The structure may include a free space radiation feed line and an SEW radiation feed line connected to the RF switch and reflectometers, the RF switch being configured to dynamically route signals to the helical antenna free space radiator or the SEW antenna feed point in response to the sensed impedance.

A method of manufacturing a hybrid antenna structure is described. The method may include providing a helical antenna free space radiator. The method may include coupling an SEW antenna feed point to the helical antenna free space radiator. The method may include configuring an RF switch and reflectometers to sense impedance at the helical antenna free space radiator and the SEW antenna feed point. The method may include connecting a free space radiation feed line and an SEW radiation feed line to the RF switch and reflectometers, wherein the RF switch may dynamically route signals to the helical antenna free space radiator or the SEW antenna feed point in response to the sensed impedance.

Some examples of the technologies and related methods described herein may further include an antenna ground positioned between the helical antenna free space radiator and the RF switch and reflectometers. The antenna ground may provide a reference impedance for the free space radiation feed line and the SEW radiation feed line.

In some examples of the technologies and related methods described herein, the RF switch and reflectometers may be configured to measure the S11 return loss at the helical antenna free space radiator and the SEW antenna feed point to dynamically determine the routing of signals.

Some examples of the technologies and related methods described herein may further include an SMA connector coupled to the free space radiation feed line and the SEW radiation feed line. The SMA connector may facilitate external connection to an RF feed line from a transmitter.

In some examples of the technologies and related methods described herein, the SEW radiation feed line may be configured to transmit signals to the SEW antenna feed point in response to the impedance sensed by the RF switch and reflectometers indicating a low reflection coefficient at the SEW antenna feed point.

In some examples of the technologies and related methods described herein, the helical antenna free space radiator may be configured to operate in response to the impedance sensed by the RF switch and reflectometers indicating a low reflection coefficient at the helical antenna free space radiator.

In some examples of the technologies and related methods described herein, the RF switch and reflectometers may be configured to dynamically alternate signal routing between the free space radiation feed line and the SEW radiation feed line based on the impedance sensed at the helical antenna free space radiator and the SEW antenna feed point.

In some examples of the technologies and related methods described herein, the SEW radiation feed line may be configured to transmit signals to the SEW antenna feed point in response to the RF switch and reflectometers detecting a high reflection coefficient at the helical antenna free space radiator.

In some examples of the technologies and related methods described herein, the RF switch may be configured to isolate the free space radiation feed line from the SEW radiation feed line during signal transmission to prevent interference between the helical antenna free space radiator and the SEW antenna feed point.

In some examples of the technologies and related methods described herein, the RF switch and reflectometers may be configured to sense impedance variations caused by proximity to metallic surfaces and dynamically adjust signal routing from the helical antenna free space radiator to the SEW antenna feed point.

Some examples of the technologies and related methods described herein may further include an SMA connector configured to provide a detachable interface for connecting the free space radiation feed line and the SEW radiation feed line to an external RF feed line from a transmitter.

In some examples of the technologies and related methods described herein, the helical antenna free space radiator may be configured to radiate signals in response to the RF switch and reflectometers detecting a low reflection coefficient at the free space radiation feed line.

In some examples of the technologies and related methods described herein, the RF switch and reflectometers may be configured to dynamically sense and route signals to the SEW antenna feed point in response to environmental conditions affecting the impedance at the helical antenna free space radiator.

DETAILED DESCRIPTION

Figure 1:
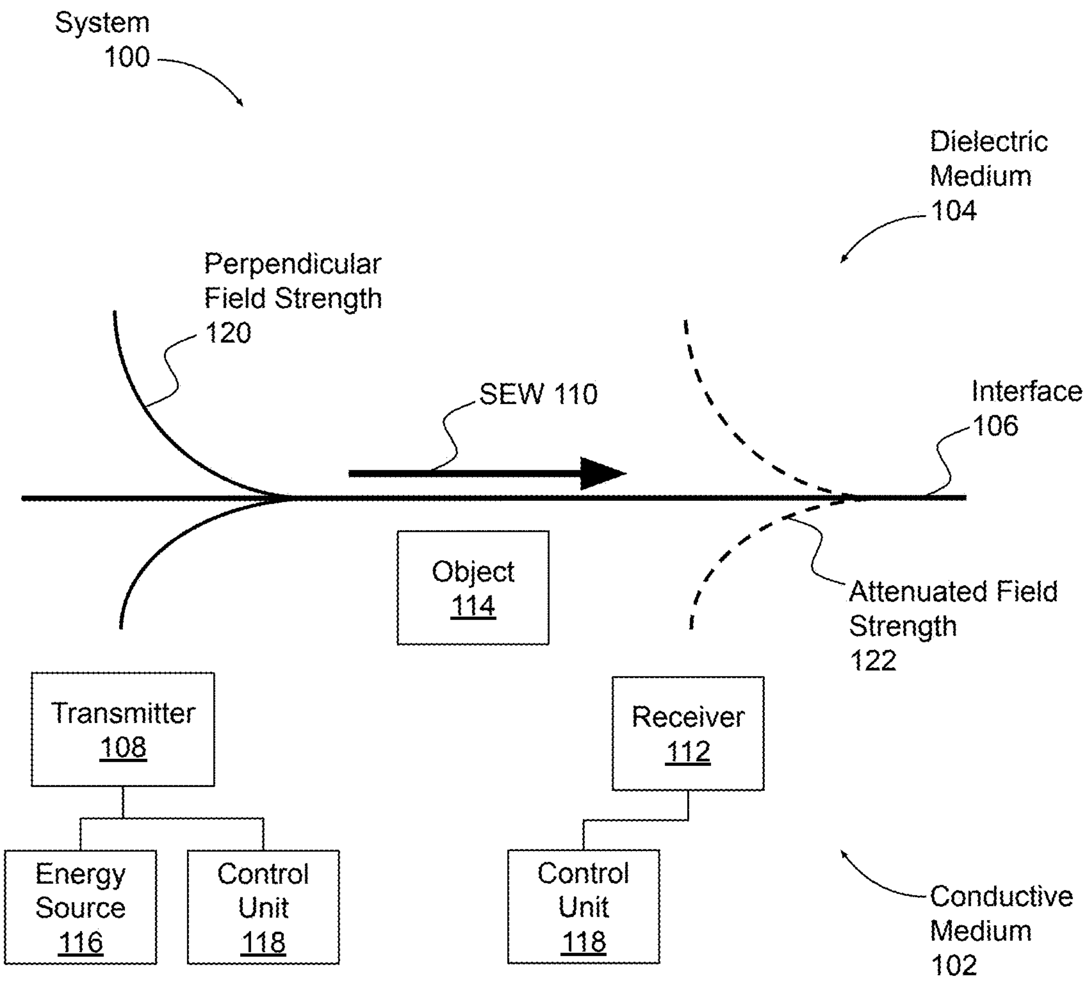
FIG. 1 illustrates a system that demonstrates the concept of surface electromagnetic waves (SEWs), in accordance with one or more implementations.

The described implementations relate to improved communications technologies and associated methods for hybrid antenna with dynamic signal routing for free-space and near-metal environments. In some examples, conventional antennas, while effective in free-space environments, may suffer from significant performance issues when placed near metallic surfaces. This may be due to the interference and reflection of signals, which can lead to reduced signal strength and increased noise. Plasmonic antennas, although capable of operating near metal surfaces, may not be optimized for free-space conditions and thus may not provide the same level of performance as conventional antennas in such environments. The challenge may lie in creating an antenna system that can dynamically adapt to different environmental conditions, ensuring optimal performance regardless of the presence of metallic surfaces. Current solutions may not offer a seamless integration of conventional and plasmonic antenna technologies, resulting in suboptimal performance in varying conditions.

According to some implementations, a system may include a hybrid antenna structure that may integrate a conventional free-space radiator and a plasmonic surface wave antenna. As used herein, the terms "plasmonic antenna" and "SEW antenna" are used interchangeably. In some implementations, the SEW antennas may the same as or similar to, or include one or more aspects of, the antennas disclosed in U.S. patent application Ser. No. 17/570,968 entitled "Apparatus, Methods and Systems for Electromagnetic Signal Transmission Through a Conductive Medium" filed on Jan. 7, 2022, and International Application No. PCT/US2024/061379 entitled "Surface Electromagnetic Wave Antenna" filed on Dec. 20, 2024, of which the entirety is incorporated by reference for all purposes. This hybrid antenna may operate as both a conventional antenna and a plasmonic antenna, depending on the environmental conditions.

The conventional antenna component may include an antenna configured to operate effectively in free space. The plasmonic antenna component may be designed to operate near metal surfaces, showing performance similar to conventional antennas in free space.

Some implementations may include impedance sensing to determine the appropriate antenna port for signal routing. The impedance at the two ports may be measured to ensure proper performance. Reflectometers may be used to measure the reflection coefficient of the two feed lines, which may help determine which antenna port has a lower reflection coefficient.

An RF switch, which may refer to a radio frequency switch, may be included to transfer the RF signal to the antenna port with the lower reflection coefficient. This switch may dynamically route signals based on the environmental conditions.

A combiner or splitter device may be used to combine the inputs of the conventional antenna and the plasmonic antenna. This device may operate as a 3 dB splitter in one direction and as a combiner in the other direction.

The hybrid antenna may operate in at least three different configurations. One configuration may involve a single antenna that may function as both plasmonic and conventional. A second configuration may involve an internal combiner that may combine a conventional antenna and a plasmonic antenna into a single structure. A third configuration may be user-configurable, where a plasmonic antenna and a conventional antenna may be combined using a splitter or combiner.

Some implementations may consider potential time delays between conventional signals and plasmonic signals due to different propagation paths. An electronic unit may be used to process normal RF data and plasmonic data separately and may then combine them in software to manage time delays and prevent interference.

The hybrid antenna may include a resonant (24) helical structure that may serve as the free-space antenna. This helical structure may be fed by two lines: one near the bottom (e.g., a 50 ohm tap) and the other near the tip. The frequency of operation of the plasmonic antenna may be selected so that its feed point may be near the tip of the helical structure, where the impedance may be very high when the device is in free space. When the tip of the helical antenna may be near metal, the line impedance at the 50 ohm feed point may be very high, routing all RF current to excite a surface electromagnetic wave (SEW) (e.g., a surface plasmon polariton).

The RF switch and reflectometers may be enclosed and separated from the radiating structure by a ground plane, which may serve as the impedance reference for the transmission lines.

The hybrid antenna may operate efficiently in both free-space and near-metal environments. In free space, the antenna may behave like a conventional antenna. Near metal, the antenna may exhibit behavior characteristic of a plasmonic antenna.

The performance of the hybrid antenna may be measured using a vector network analyzer connected to the S11 (i.e., reflection coefficient) port. The signal measurements may show that the hybrid antenna may operate around 10 dB in a wide band in free space and may exhibit plasmonic behavior near metal.

Some implementations may ensure that the user may not need to be aware of the internal workings of the hybrid antenna. The user may experience improved antenna performance without needing to know whether the conventional or plasmonic antenna may be active.

Aspects of the subject matter described in this disclosure can be implemented to realize one or more of the following potential advantages. The described techniques may be implemented to support seamless integration of conventional and plasmonic antennas, which may enhance overall antenna performance in varying environmental conditions. The hybrid antenna structure may provide flexibility in signal routing, ensuring optimal performance whether in free space or near metal surfaces. The use of impedance sensing and RF switching may allow for dynamic adaptation to changing conditions, potentially reducing signal interference and improving data transmission rates. The user may benefit from improved antenna efficiency without needing to understand the underlying technology, as the system may automatically manage the transition between conventional and plasmonic modes. This approach may lead to more reliable and robust communication systems, particularly in environments where metal surfaces are prevalent.

Aspects of the disclosure are initially described in the context of communications technologies. Aspects of the disclosure are additionally illustrated by and described with reference to example implementations. Aspects of the disclosure are further illustrated by and described with reference to a flowchart that relates to methods of manufacturing hybrid antennas with dynamic signal routing for free-space and near-metal environments.

FIG. 1 illustrates a system 100 that demonstrates the concept of SEWs, in accordance with one or more implementations. The system 100 may include a conductive medium 102, such as a body of water, organic tissue, a metallic plane, and/or other conductive media. Adjacent to the conductive medium 102, there may be a dielectric medium 104, such as air and/or other dielectric media, which may interface with the conductive medium 102. The interface 106 between the conductive medium 102 and the dielectric medium 104 may be where SEWs are induced and may propagate.

The system 100 may also include an antenna 108, which may be positioned near the interface 106. The antenna 108 may be positioned within the conductive medium 102 or within the dielectric medium 104. The antenna 108 may be responsible for generating an electromagnetic field that may excite SEWs at the interface 106 of the conductive medium 102 and the dielectric medium 104. The excited SEWs may then travel along the interface 106, as indicated by the arrow of SEW 110, which may represent the direction of wave propagation.

To help visualize the phenomenon of SEWs, one may consider an analogy to ripples on a pond. When a stone is dropped into a still pond, ripples may form and spread out across the surface of the water. Similarly, the antenna 108 may be thought of as the stone, and the SEWs may be akin to the ripples that spread along the conductive medium 102. Just as the ripples may move outward from the point of impact, SEWs may propagate along the interface 106, carrying energy with them.

The system 100 may further include a detector 112, which may be positioned at a distance from the antenna 108 along the interface 106. The detector 112 may be positioned within the conductive medium 102 or within the dielectric medium 104. The detector 112 may be configured to receive the SEWs after they have propagated along the interface 106. This may be analogous to placing one's hand in the water at a distance from where the stone was dropped, feeling the ripples as they pass by.

Additionally, the system 100 may include an object 114 positioned within the conductive medium 102 or within the dielectric medium 104, which may be representative of an obstacle that SEWs may encounter during propagation. The interaction of SEWs with the object 114 may lead to scattering of waves, similar to how water ripples may change direction or form patterns when they encounter a leaf or a rock in the pond.

The system 100 may include an energy source 116, such as a radio frequency generator, which may be connected to the antenna 108. The energy source 116 may provide the necessary power for the antenna 108 to generate the electromagnetic field that excites the SEWs. This may be thought of as the force with which the stone is thrown into the pond, affecting the size and strength of the resulting ripples.

In some implementations, the system 100 may include a control unit 118, which may be operatively coupled to the antenna 108 and/or the detector 112. The control unit 118 may be responsible for coordinating the generation and detection of SEWs, much like a person orchestrating the timing of stones being dropped into the pond to create a specific pattern of ripples.

From a more technical perspective, SEWs may be understood as a type of wave that propagates along the interface between two media with different dielectric properties. In FIG. 1, the conductive medium 102 and the dielectric medium 104 may form such an interface (e.g., interface 106) where SEWs may be excited and propagate. The antenna 108 may serve as a transducer that converts electrical signals from the energy source 116 into electromagnetic fields, which may then couple to the interface 106 and give rise to SEWs.

The propagation of SEWs along the interface 106 may be characterized by a wave vector that is parallel to the interface 106. This wave vector may be larger than the wave vector of free photons in the dielectric medium 104, which may result in a confinement of the electromagnetic field to the vicinity of the interface 106. The SEW's field strength may decay exponentially in the direction perpendicular to the interface 106, as illustrated by a field strength 120 extending into the dielectric medium 104 and the conductive medium 102. These field strengths may also decay as the SEW propagates along the interface 106, as illustrated by an attenuated field strength 122. The detector 112 may be designed to couple to these confined, attenuated fields and receive the SEWs after they have propagated along the interface 106.

The excitation of SEWs by the antenna 108 may involve the conversion of the electromagnetic energy into a surface-bound mode, which may be facilitated by the specific design of the antenna 108. The antenna 108 may be optimized to match the impedance of the SEWs to maximize energy transfer into the SEW mode. The object 114 submerged within the conductive medium 102 may introduce perturbations in the SEWs, which may be detected by the detector 112 and analyzed by the control unit 118 to infer properties of the object 114. Examples of such properties may include one or more of size, shape, location, material properties, and/or other properties.

The mathematical description of SEWs may be derived from Maxwell's equations, which govern the behavior of electromagnetic fields. The wave equation for TM-polarized SEWs may be reduced to a one-dimensional Schrödinger equation:

$$\frac{d^2\psi}{dz^2} + \left(k^2 - V(z)\right)\psi = 0 \quad \text{(EQN. 1)}$$

where ψ is the effective wave function introduced as $E_z=\psi/\sqrt{\varepsilon}$, and V(z) is the effective potential energy that guides the propagation of SEWs along the interface. The term $k^2$ may represent the total energy of the SEWs and the term e represents the dielectric permittivity of the medium.

For TE-polarized SEWs, the wave equation may not depend on the gradient terms and may be expressed as:

$$\frac{d^2E_Z}{dz^2} + k^2E_z = 0 \quad \text{(EQN. 2)}$$

In the case of a sharp interface between two media with dielectric permittivities $\epsilon_1$ and $\epsilon_2$, the SEW wave vector for TM-polarized waves may be given by:

$$k_{SEW} = \sqrt{\frac{\omega^2}{c^2}\frac{\epsilon_1\epsilon_2}{\epsilon_1+\epsilon_2}} \quad \text{(EQN. 3)}$$

where ω is the angular frequency of the SEWs, and c is the speed of light in vacuum.

The presence of dielectric permittivity gradients across the interface 106 may lead to additional terms in the effective potential $V_z$, which may result in the formation of a potential well that supports bound states of SEWs. These bound states may correspond to surface modes with long propagation lengths and may be excited by the antenna 108 with appropriate phase matching.

The system 100 may thus utilize SEWs for various applications, including communication and sensing, by exploiting the unique properties of SEWs at the interface 106 between the conductive medium 102 and the dielectric medium 104. The control unit 118 may process the received signals to extract information about the propagation and interaction of SEWs with the environment and objects within it.

Figure 2:
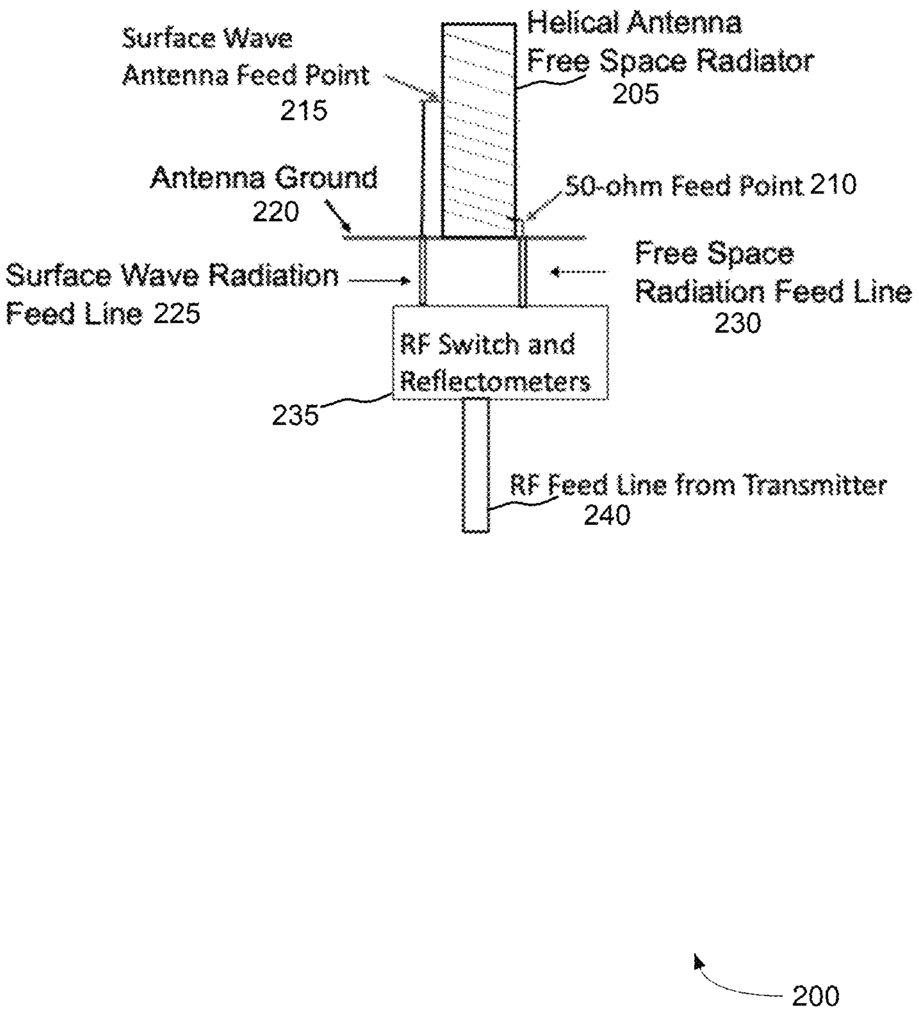
FIG. 2 shows hybrid antenna diagram which supports hybrid antennas with dynamic signal routing for free-space and near-metal environments in accordance with various aspects of the present disclosure.

FIG. 2 shows hybrid antenna diagram 200 which supports hybrid antennas with dynamic signal routing for free-space and near-metal environments in accordance with various aspects of the present disclosure. As depicted in FIG. 2, the hybrid antenna diagram 200 may include one or more of a helical antenna free space radiator 205, a 50-ohm feed point 210, an SEW antenna feed point 215, an antenna ground 220, an SEW radiation feed line 225, a free space radiation feed line 230, an RF switch and reflectometers 235, an RF feed line from transmitter 240, and/or other components.

The helical antenna free space radiator 205 may be designed to operate efficiently in free-space environments. The helical antenna free space radiator 205 may include a resonant (λ/4) helical structure that may support radiating RF currents. The structure may be configured to function as a free-space radiator by transmitting electromagnetic waves effectively in open-air conditions. In some implementations, the helical antenna free space radiator 205 may be positioned to interact with other components, such as the 50-ohm feed point 210, to ensure proper signal routing. The helical antenna free space radiator 205 may take various forms, such as a cylindrical or conical helix, depending on the specific application requirements.

The 50-ohm feed point 210 may serve as the connection point for the helical antenna free space radiator 205. The 50-ohm feed point 210 may be located near the base of the helical structure to ensure compatibility with standard RF transmission lines. The feed point may be designed to match the impedance of the transmission line, minimizing signal reflection. In some implementations, the 50-ohm feed point 210 may be electrically coupled to the free space radiation feed line 230 to facilitate signal transfer. The 50-ohm feed point 210 may be implemented as a soldered connection, a coaxial connector, or another suitable interface.

The SEW antenna feed point 215 may be positioned to facilitate the excitation of SEWs. The SEW antenna feed point 215 may be located near the tip of the helical structure, where the line impedance in free space may be high. This positioning may allow the feed point to effectively couple RF energy into SEWs when the antenna is near a metal or low-impedance surface. In some implementations, the SEW antenna feed point 215 may be connected to the SEW radiation feed line 225 to route signals appropriately. The SEW antenna feed point 215 may be implemented as a conductive terminal or a specialized connector.

The antenna ground 220 may act as the reference point for the hybrid antenna diagram 200. The antenna ground 220 may provide a stable electrical reference for the various components of the hybrid antenna structure. The ground may be implemented as a conductive plane or a grounded enclosure that separates the radiating structure from the RF switch and reflectometers 235. In some implementations, the antenna ground 220 may be electrically connected to both the free space radiation feed line 230 and the SEW radiation feed line 225. The antenna ground 220 may be constructed from materials such as copper, aluminum, or other conductive metals.

The SEW radiation feed line 225 may connect the SEW antenna feed point 215 to the RF switch and reflectometers 235. The SEW radiation feed line 225 may be designed to transmit RF signals with minimal loss and may be constructed from coaxial cables or other suitable transmission lines. The feed line may ensure that signals from the SEW antenna feed point 215 are routed to the RF switch and reflectometers 235 for impedance sensing and signal processing. In some implementations, the SEW radiation feed line 225 may include shielding to reduce electromagnetic interference. The SEW radiation feed line 225 may vary in length and material depending on the specific design requirements.

The free space radiation feed line 230 may link the 50-ohm feed point 210 to the RF switch and reflectometers 235. The free space radiation feed line 230 may be configured to carry RF signals efficiently between the 50-ohm feed point 210 and the RF switch and reflectometers 235. The feed line may be implemented as a coaxial cable, microstrip line, or another type of transmission line. In some implementations, the free space radiation feed line 230 may be positioned parallel to the SEW radiation feed line 225 to maintain a compact design. The free space radiation feed line 230 may include connectors or terminals to facilitate secure connections.

The RF switch and reflectometers 235 may dynamically route signals based on the impedance measurements. The RF switch and reflectometers 235 may include components that measure the reflection coefficient at the helical antenna free space radiator 205 and the SEW antenna feed point 215. Based on these measurements, the RF switch may direct the RF signal to the appropriate feed line for optimal operation. In some implementations, the RF switch and reflectometers 235 may be housed in an enclosure that is electrically connected to the antenna ground 220. The RF switch and reflectometers 235 may be implemented using solid-state devices, mechanical relays, or other switching technologies.

The RF feed line from transmitter 240 may deliver the RF signal to the hybrid antenna diagram 200. The RF feed line from transmitter 240 may be designed to carry RF signals from an external transmitter to the RF switch and reflectometers 235. The feed line may be constructed from low-loss coaxial cable or other suitable transmission media to ensure signal integrity. In some implementations, the RF feed line from transmitter 240 may be connected to the RF switch and reflectometers 235 through a standard RF connector. The RF feed line from transmitter 240 may vary in length and type depending on the transmitter's location and the system's design constraints.

In some implementations, the helical antenna free space radiator 205 may be positioned vertically with the 50-ohm feed point 210 located near its base. The SEW antenna feed point 215 may be situated near the tip of the helical structure, allowing for the selective routing of RF currents based on impedance conditions. The antenna ground 220 may separate the radiating structure from the RF switch and reflectometers 235, which are housed in an enclosure below the ground plane. The SEW radiation feed line 225 and the free space radiation feed line 230 may connect the respective feed points to the RF switch and reflectometers 235. The RF feed line from the transmitter 240 may deliver the RF signal to the switch and reflectometers, which may then determine the appropriate feed line to activate based on the measured reflection coefficients.

Figure 3:
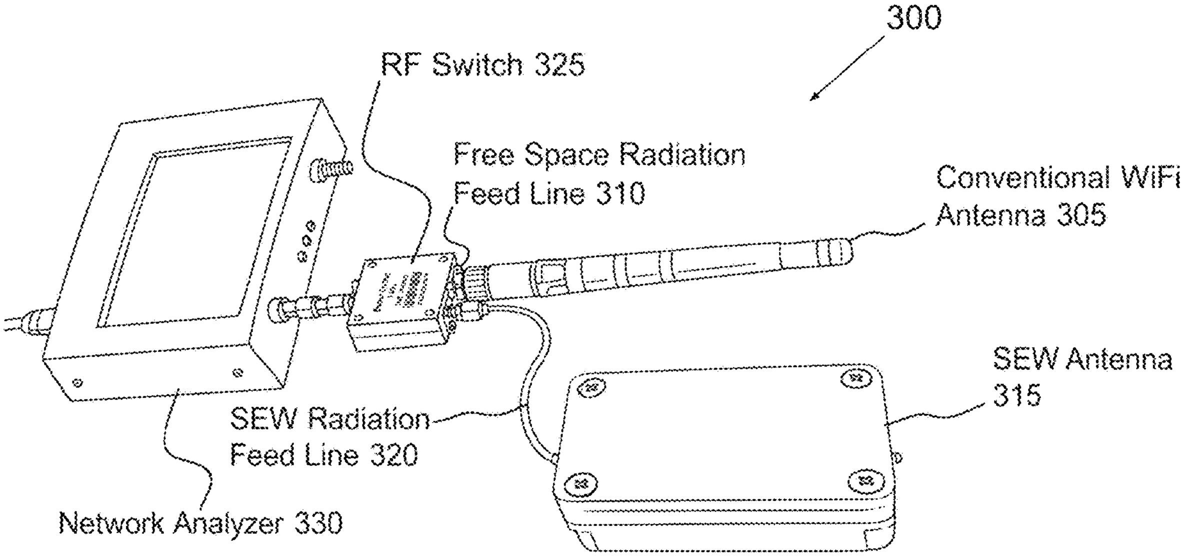
FIG. 3 shows antenna testing setup which supports hybrid antennas with dynamic signal routing for free-space and near-metal environments in accordance with various aspects of the present disclosure.

FIG. 3 shows antenna testing setup 300 which supports hybrid antennas with dynamic signal routing for free-space and near-metal environments in accordance with various aspects of the present disclosure. As depicted in FIG. 3, the antenna testing setup 300 may include one or more of a conventional WiFi antenna 305, a free space radiation feed line 310, an SEW antenna 315, an SEW radiation feed line 320, an RF switch 325, a network analyzer 330, and/or other components.

The conventional WiFi antenna 305 may include a radiating element configured to emit and receive radio frequency signals within a prescribed operational bandwidth. The conventional WiFi antenna 305 may be designed to support omnidirectional or directional radiation patterns, depending on the intended application. The geometry and material composition of the radiating element may be selected to optimize signal propagation efficiency and minimize interference. The conventional WiFi antenna 305 may be integrated with conductive traces, dipole elements, or patch structures to enhance performance characteristics such as gain, polarization, and impedance matching. The free space radiation feed line 310 may be connected to the conventional WiFi antenna 305 to facilitate free space signal transmission. In some implementations, the free space radiation feed line 310 may be the same as or similar to the free space radiation feed line 230, as described herein.

The SEW antenna 315 may be configured to couple to SEW during transmission or reception of signals carried by the SEWs. The SEW antenna 310 may be the same as or similar to SEW antennas described herein. The SEW radiation feed line 320 may be connected to the SEW antenna 315 to facilitate SEW signal transmission. The SEW radiation feed line 320 may include a high-impedance connection to ensure proper signal routing for SEW propagation. In some implementations, the SEW radiation feed line 320 may be similar to the SEW radiation feed line 225, as described herein.

The RF switch 325 may be used to dynamically route signals between the free space radiation feed line 310 and the SEW radiation feed line 320. The RF switch 325 may include electronic components capable of determining the appropriate feed line based on impedance measurements. The RF switch 325 may be positioned within an enclosure that separates it from the radiating structure by a ground plane. In some implementations, the RF switch 325 may be similar to the RF switch and reflectometers 235, as described herein.

The network analyzer 330 may be used to test and measure the performance of the hybrid antenna setup. The network analyzer 330 may be configured to determine parameters such as impedance, reflection coefficients, and signal strength. The network analyzer 330 may be connected to the transmission lines to evaluate the hybrid antenna's performance in both free-space and near-metal environments. In some implementations, the network analyzer 330 may be used in conjunction with other diagnostic tools to assess the hybrid antenna's operational characteristics.

In some implementations, the conventional WiFi antenna 305 may be positioned to serve as the primary radiating structure, with the free space radiation feed line 310 connected near the bottom. The SEW radiation feed line 320 may be connected to the SEW antenna 315. The RF switch 325 may be configured to route the RF signal to either the free space radiation feed line 310 or the SEW radiation feed line 320 based on the impedance measurements.

Figure 4:
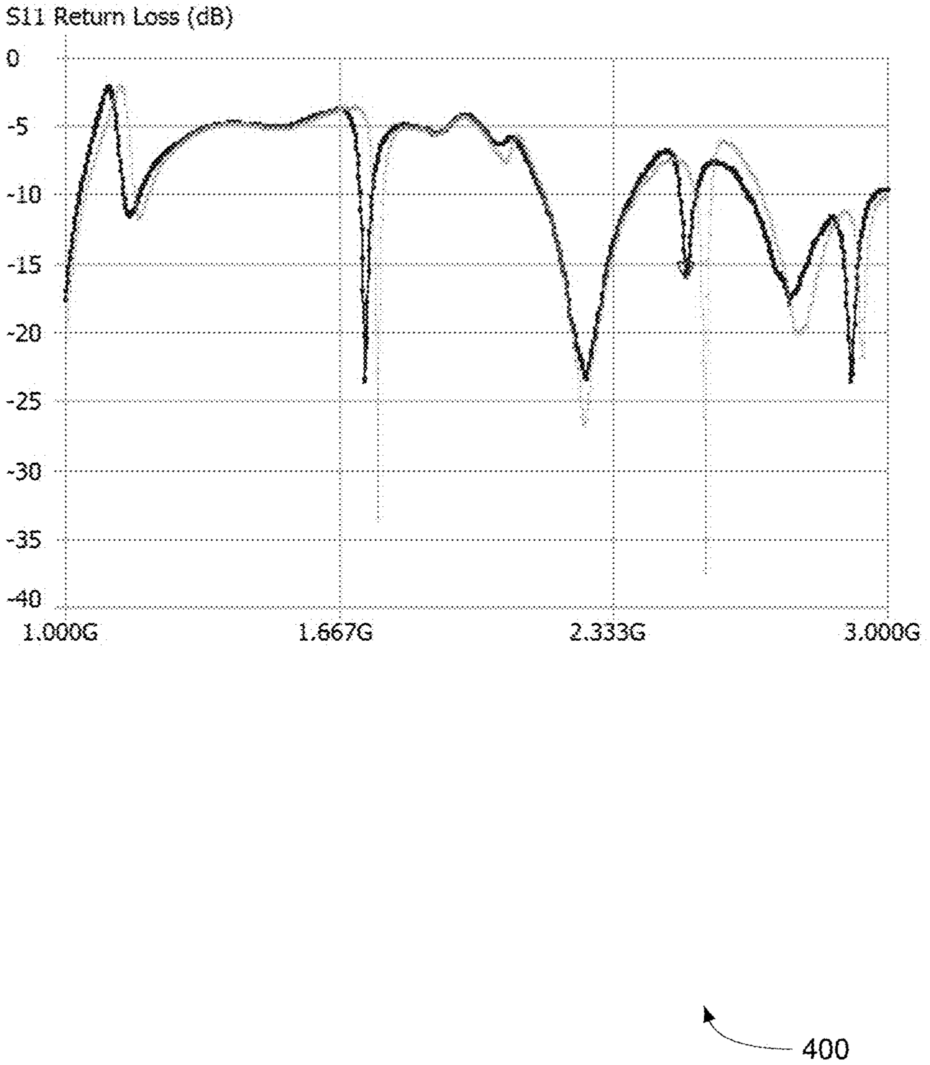
FIG. 4 shows a line graph illustrating the S11 return loss versus frequency for hybrid plasmonic/conventional WiFi antenna configurations in accordance with various aspects of the present disclosure.

FIG. 4 shows a line graph 400 illustrating the S11 return loss (dB) versus frequency (GHz) for hybrid plasmonic/conventional WiFi antenna configurations in accordance with various aspects of the present disclosure. The horizontal axis of the line graph 400 may represent the frequency in gigahertz (GHz), ranging from 1.000 GHz to 3.000 GHz. The vertical axis may represent the S11 return loss in decibels (dB), with values ranging from 0 dB to −40 dB. The scale on both axes may be linear.

The data points in the line graph 400 may be represented by two distinct lines. The light line may indicate the return loss data for the hybrid antenna configuration in free space, while the dark line may indicate the return loss data for the hybrid antenna configuration near metal. The lines may exhibit various peaks and valleys, indicating the performance of the antenna at different frequencies.

Notable features of the line graph 400 may include several peaks and valleys in the return loss data. For instance, both lines may show significant dips at certain frequencies, such as around 1.667 GHz and 2.333 GHZ, indicating frequencies where the antenna may have better performance (lower return loss). Conversely, peaks in the lines may indicate frequencies where the return loss is higher, suggesting less efficient performance.

Figure 5:
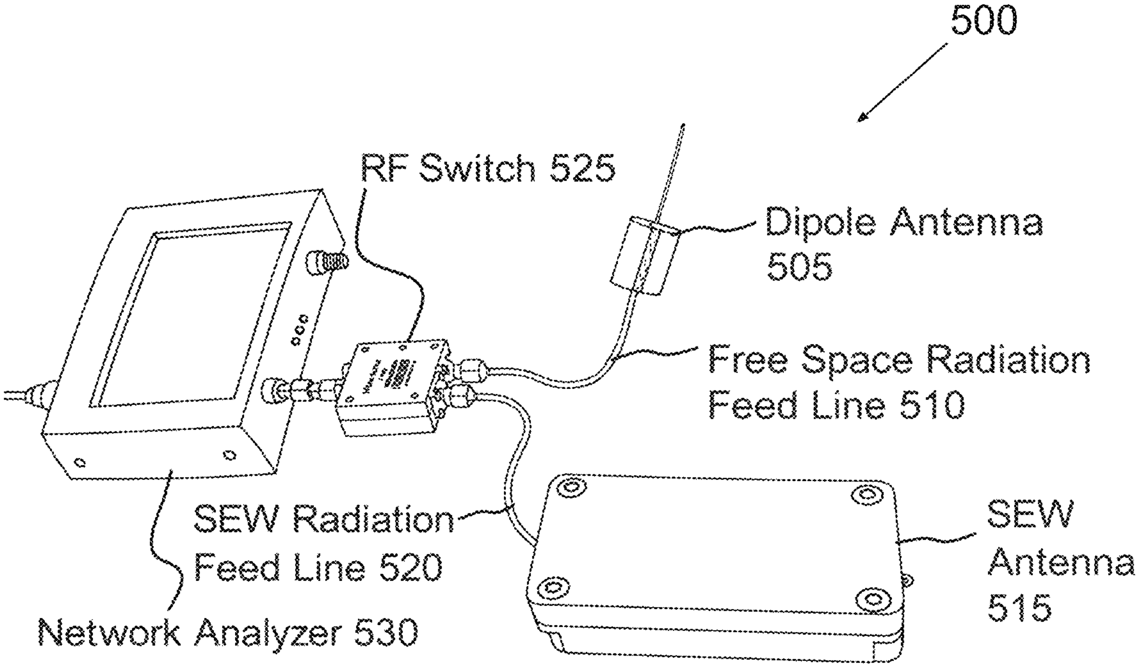
FIG. 5 shows antenna testing setup which supports hybrid antennas with dynamic signal routing for free-space and near-metal environments in accordance with various aspects of the present disclosure.

FIG. 5 shows antenna testing setup 500 which supports hybrid antennas with dynamic signal routing for free-space and near-metal environments in accordance with various aspects of the present disclosure. As depicted in FIG. 5, the antenna testing setup 500 may include one or more of a dipole antenna 505, a free space radiation feed line 510, an SEW antenna 515, an SEW radiation feed line 520, an RF switch 525, a network analyzer 530, and/or other components.

The dipole antenna 505 may be configured to operate in both free-space and near-metal environments. In some implementations, the dipole antenna 505 may be the same as or dipole antenna free space radiator 205, as described herein. The free space radiation feed line 510 may be connected to the dipole antenna 505 to facilitate free space signal transmission. In some implementations, the free space radiation feed line 510 may be the same as or similar to the free space radiation feed line 230 and/or free space radiation feed line 310, as described herein.

The SEW antenna 515 may be configured to couple to SEW during transmission or reception of signals carried by the SEWs. In some implementations, the SEW antenna 515 may be similar to SEW antenna 315, as described herein. The SEW radiation feed line 320 may include a high-impedance connection to ensure proper signal routing for SEW propagation. In some implementations, the SEW radiation feed line 520 may be similar to the SEW radiation feed line 225 and/or SEW radiation feed line 320, as described herein.

The RF switch 525 may be used to dynamically route signals between the free space radiation feed line 510 and the SEW radiation feed line 520. In some implementations, the RF switch 525 may be similar to the RF switch and reflectometers 235 and/or RF switch 325, as described herein. The network analyzer 530 may be used to test and measure the performance of the hybrid antenna setup. In some implementations, the network analyzer 530 may be similar to the network analyzer 330, as described herein.

In some implementations, the dipole antenna 505 may be positioned to serve as the primary radiating structure, with the free space radiation feed line 510 connected near the bottom. The SEW radiation feed line 520 may be connected to the SEW antenna 515. The RF switch 525 may be configured to route the RF signal to either the free space radiation feed line 510 or the SEW radiation feed line 520 based on the impedance measurements.

Figure 6:
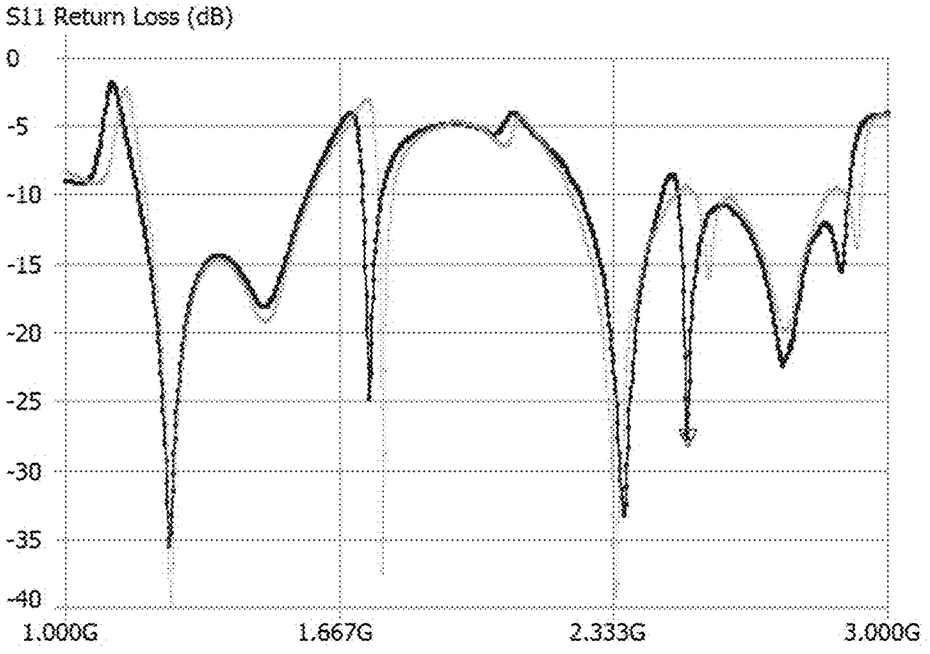
FIG. 6 shows a line graph illustrating the S11 return loss versus frequency for hybrid plasmonic/helical antenna configurations in accordance with various aspects of the present disclosure.

FIG. 6 shows a line graph 600 illustrating the S11 return loss (dB) versus frequency (GHz) for hybrid plasmonic/dipole antenna configurations in accordance with various aspects of the present disclosure. The horizontal axis of the line graph 600 may represent the frequency in gigahertz (GHz), ranging from 1.000 GHz to 3.000 GHz. The vertical axis may represent the S11 return loss in decibels (dB), ranging from 0 dB to −40 dB. The scale on both axes may be linear.

The line graph 600 may include two distinct lines: a light line and a dark line. The light line may represent the "free space" data, indicating the performance of the hybrid antenna when it is in a free space environment. The dark line may represent the "near metal" data, indicating the performance of the hybrid antenna when it is near a metal surface.

The data points in the line graph 600 may be connected by continuous lines, showing the trends and variations in the S11 return loss across the frequency range. Notable features of the line graph 600 may include several peaks and valleys, which may indicate resonant frequencies and impedance mismatches. For instance, the light line may exhibit a significant dip around 2.333 GHz, suggesting a resonant frequency with minimal return loss in free space. Similarly, the dark line may show a different pattern of dips and peaks, reflecting the impact of the near-metal environment on the antenna's performance.

Figure 7:
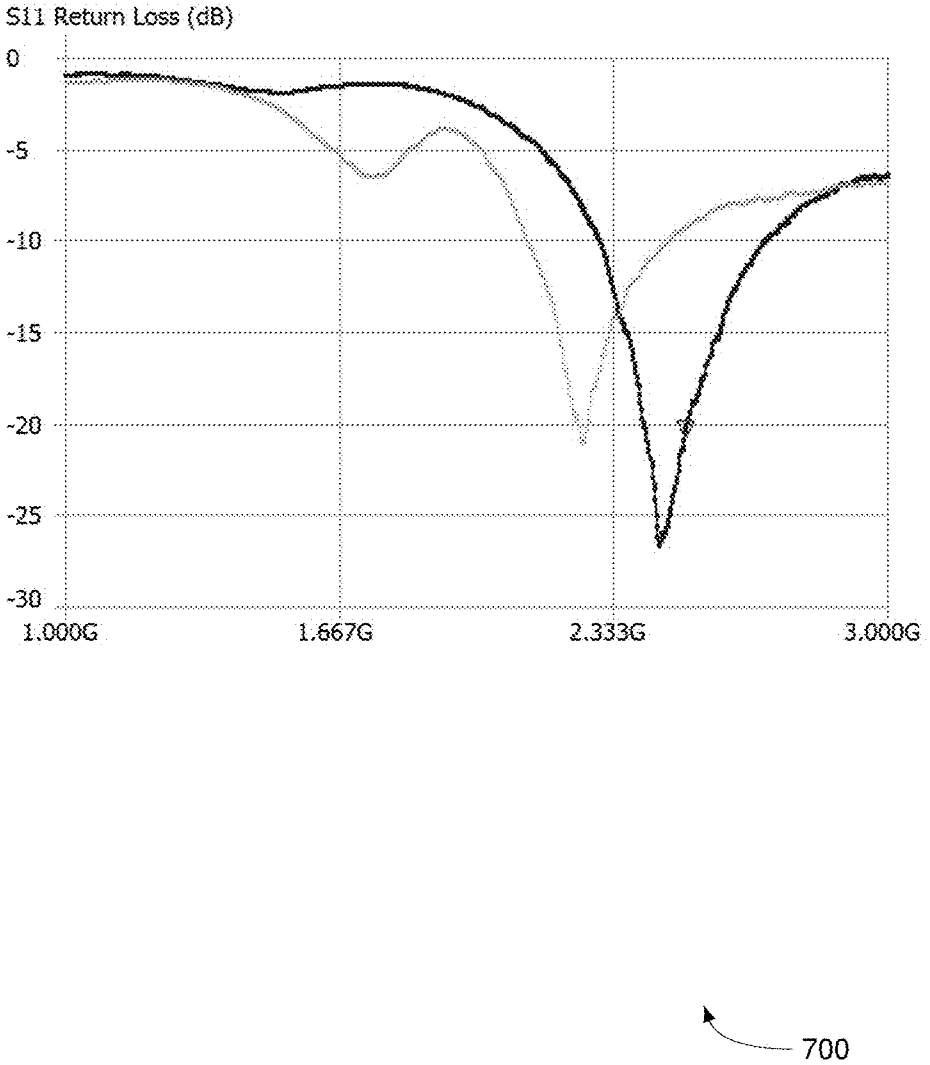
FIG. 7 shows a line graph illustrating the S11 return loss as a function of frequency for hybrid antenna configurations having a dipole or a COTS dipole with no splitter in accordance with various aspects of the present disclosure

FIG. 7 shows a line graph 700 illustrating the S11 return loss (dB) as a function of frequency (GHz) for hybrid antenna configurations having a dipole or a COTS dipole with no splitter in accordance with various aspects of the present disclosure. The horizontal axis of the line graph 700 may represent the frequency in gigahertz (GHz), ranging from 1.000 GHz to 3.000 GHz. The scale may be linear, with major tick marks at intervals of 0.666 GHz. The vertical axis may represent the S11 return loss in decibels (dB), ranging from 0 dB at the top to −30 dB at the bottom. The scale may also be linear, with major tick marks at intervals of 5 dB.

The data points in the line graph 700 may be represented as continuous lines, with one line being lighter in shade and the other darker in shade. The light line may represent "COTS dipole with no splitter" data while the dark line represents "dipole with no splitter" data. The light line may exhibit a distinct dip in return loss at approximately 2.333 GHZ, reaching a minimum value of approximately −25 dB. This dip may indicate a resonant frequency where the antenna system achieves optimal impedance matching in a free space environment. The dark line may also exhibit a dip in return loss, but this dip may be less pronounced and may occur at a slightly different frequency.

The line graph 700 may include notable features such as peaks and valleys. The light line may show a relatively smooth curve with a pronounced valley at the resonant frequency, while the dark line may exhibit a broader and less pronounced valley. These differences may highlight the impact of the coupler on the performance of the hybrid antenna system.

Figure 8:
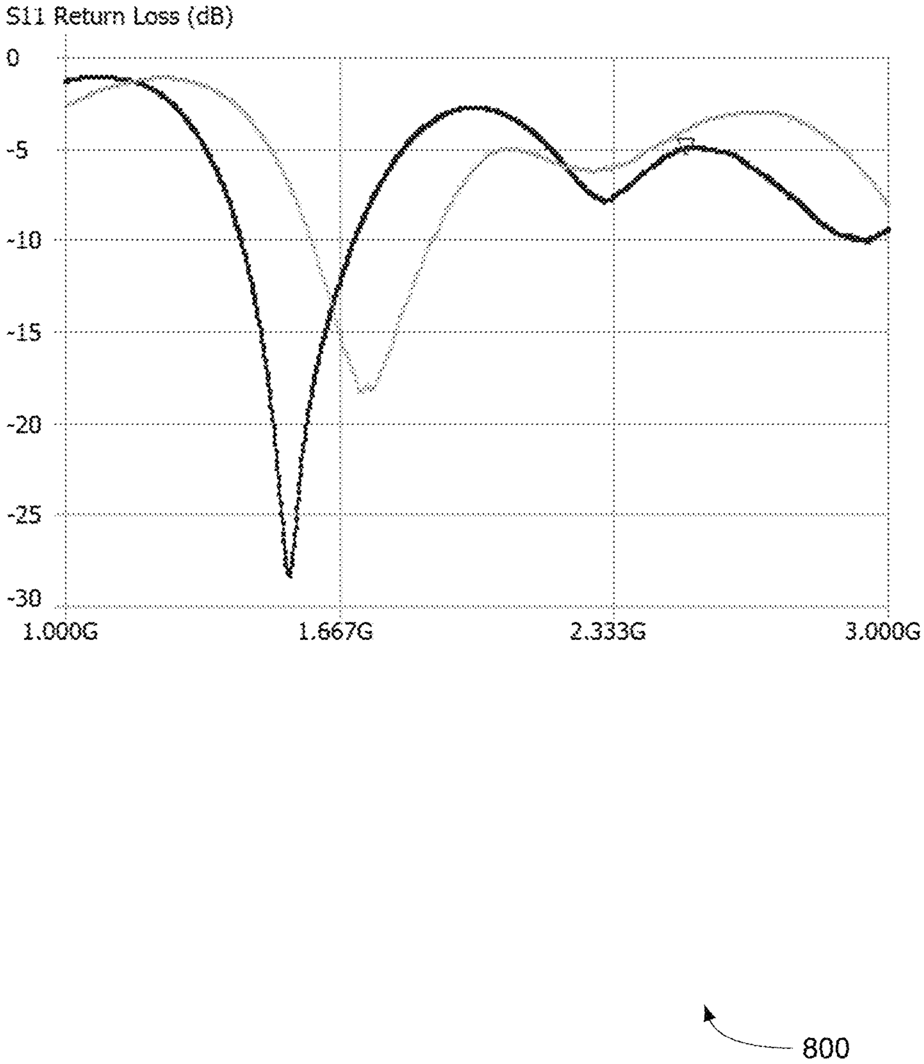
FIG. 8 shows a line graph illustrating the S11 return loss versus frequency for hybrid antenna configurations having a dipole or a COTS dipole with a splitter in accordance with various aspects of the present disclosure

FIG. 8 shows a line graph 800 illustrating the S11 return loss (dB) versus frequency (GHz) for hybrid antenna configurations having a dipole or a COTS dipole with a splitter in accordance with various aspects of the present disclosure. The horizontal axis of the line graph 800 may represent the frequency in gigahertz (GHz), ranging from 1.000 GHz to 3.000 GHz. The vertical axis may represent the S11 return loss in decibels (dB), ranging from 0 dB to −30 dB. The scale on both axes may be linear, providing a clear representation of the return loss across the specified frequency range.

The line graph 800 may include two distinct lines to differentiate between the data sets. The light line may represent the "COTS dipole with splitter" data, while the dark line may represent the "dipole with splitter" data. These lines may be continuous and smooth, indicating the return loss performance of each antenna configuration over the frequency range.

Notable features of the line graph 800 may include peaks and valleys that indicate the resonant frequencies and the efficiency of the antenna configurations. For instance, the dark line may exhibit a significant dip around 1.667 GHz, reaching a return loss of approximately −25 dB, suggesting a high efficiency at this frequency. The light line may show a less pronounced dip around the same frequency, indicating a different performance characteristic for the "COTS dipole with splitter" configuration.

Figure 9:
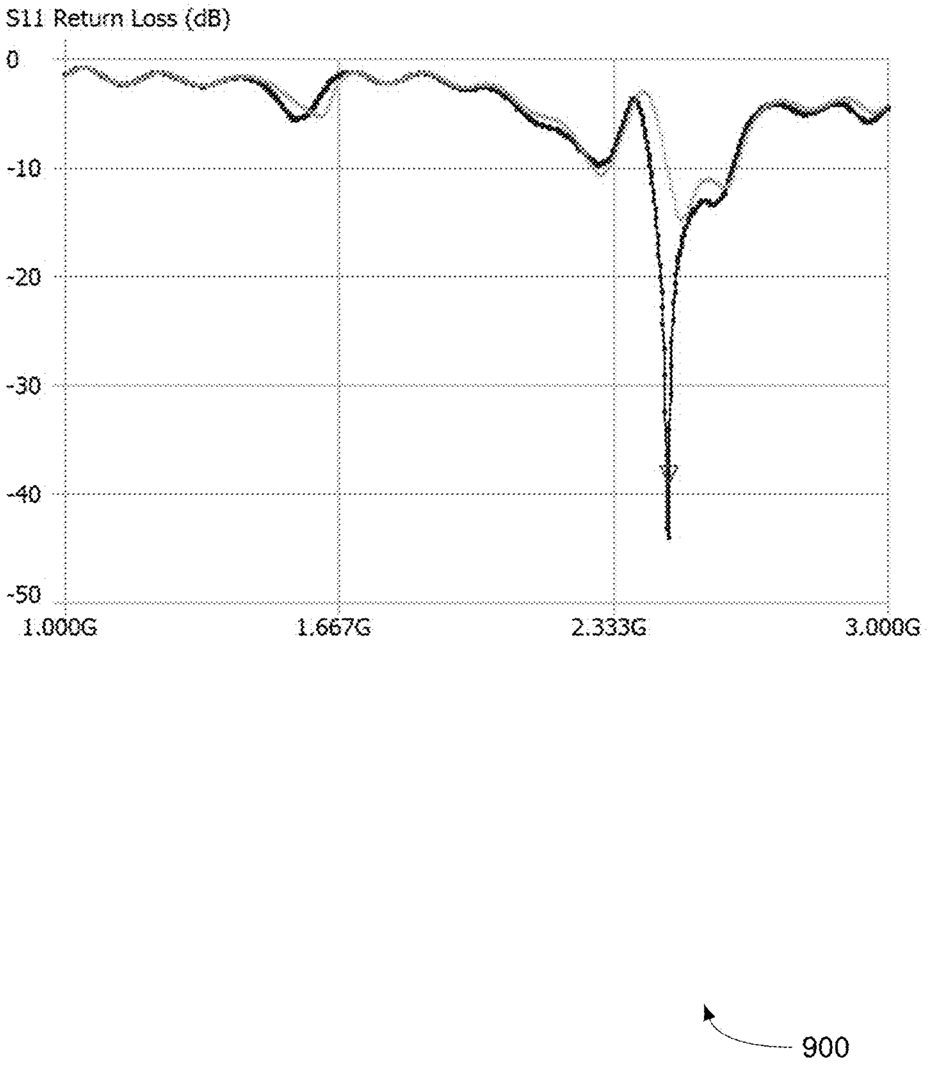
FIG. 9 shows a line graph illustrating the S11 return loss versus frequency for a hybrid antenna design in accordance with various aspects of the present disclosure

FIG. 9 shows a line graph 900 illustrating the S11 return loss (dB) versus frequency (GHz) for a hybrid antenna design in accordance with various aspects of the present disclosure. The line graph 900 may represent the performance characteristics of a hybrid plasmonic/conventional WiFi antenna configuration under different environmental conditions. The horizontal axis of the line graph 900 may represent the frequency in gigahertz (GHz), ranging from 1.000 GHz to 3.000 GHz. The vertical axis may represent the S11 return loss in decibels (dB), ranging from 0 dB to −50 dB. The scale on both axes may be linear.

The line graph 900 may include two distinct lines to represent different data sets. The light line may represent the "free space" data, indicating the performance of the hybrid antenna when it is in a free space environment. The dark line may represent the "near metal" data, indicating the performance of the hybrid antenna when it is in proximity to a metal surface.

The data points in the line graph 900 may be connected by continuous lines, showing the trends in S11 return loss across the frequency range. Notable features of the line graph 900 may include peaks and valleys that indicate the resonant frequencies and the efficiency of the antenna at those frequencies. For instance, a significant dip in the dark line around 2.333 GHz may suggest a resonant frequency where the return loss is minimized, indicating efficient antenna performance near metal.

The light line may exhibit a different pattern, with less pronounced dips, suggesting variations in performance when the antenna is in free space. The comparison between the light and dark lines may highlight the impact of environmental conditions on the hybrid antenna's performance.

Figure 10:
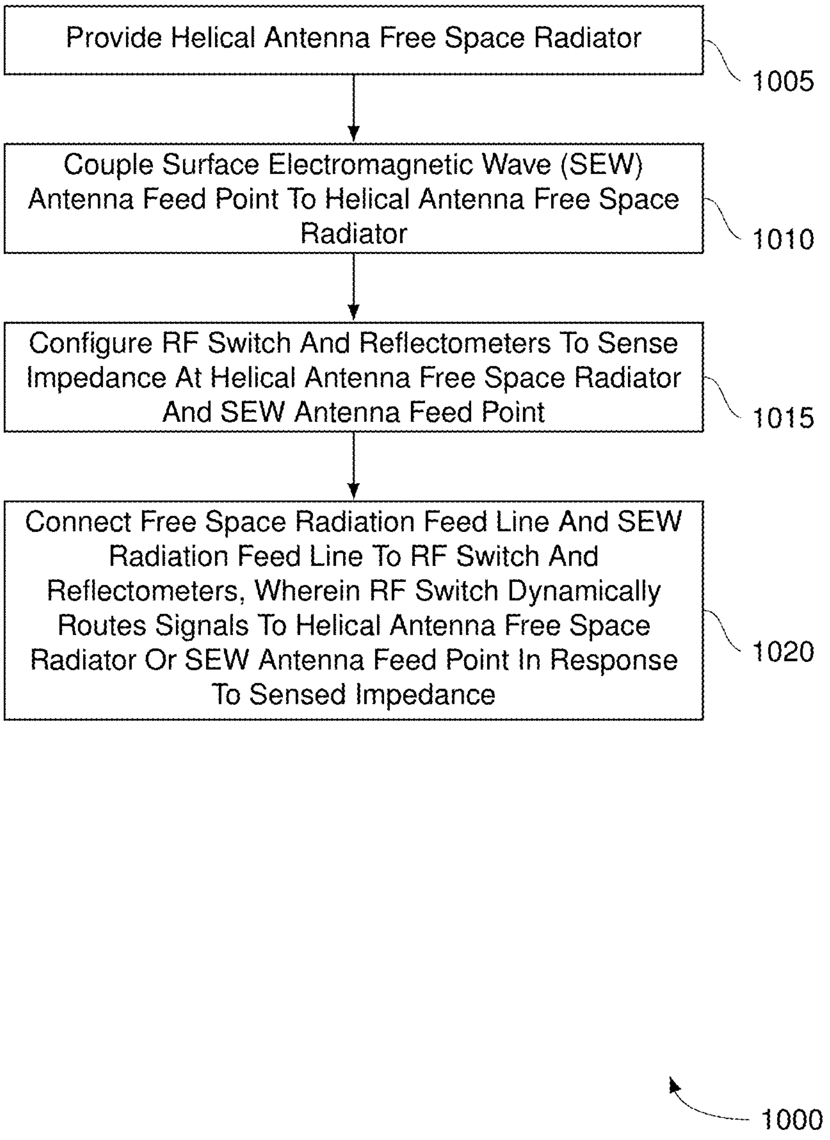
FIG. 10 shows a flowchart illustrating a method of manufacturing hybrid antennas with dynamic signal routing for free-space and near-metal environments in accordance with various aspects of the present disclosure.

FIG. 10 shows a flowchart illustrating a method 1000 of manufacturing hybrid antennas with dynamic signal routing for free-space and near-metal environments in accordance with various aspects of the present disclosure.

At 1005, the method 1000 may include providing a helical antenna free space radiator. The operations of 1005 may be performed in accordance with examples as disclosed herein. In some examples, aspects of the operations of 1005 may involve a helical antennas 205, 305, and/or 505 as described with reference to FIGS. 2, 3, and 5.

At 1010, the method 1000 may include coupling an SEW antenna feed point to the helical antenna free space radiator. The operations of 1010 may be performed in accordance with examples as disclosed herein. In some examples, aspects of the operations of 1010 may involve an SEW antenna feed point 215 as described with reference to FIG. 2.

At 1015, the method 1000 may include configuring an RF switch and reflectometers to sense impedance at the helical antenna free space radiator and the SEW antenna feed point. The operations of 1015 may be performed in accordance with examples as disclosed herein. In some examples, aspects of the operations of 1015 may involve RF switch and reflectometers 235, RF switches 320 and/or 525, and/or reflectometers 325 and/or 520 as described with reference to FIGS. 2, 3, and 5.

At 1020, the method 1000 may include connecting a free space radiation feed line and an SEW radiation feed line to the RF switch and reflectometers, wherein the RF switch dynamically routes signals to the helical antenna free space radiator or the SEW antenna feed point in response to the sensed impedance. The operations of 1020 may be performed in accordance with examples as disclosed herein. In some examples, aspects of the operations of 1020 may involve a free space radiation feed lines 310 and/or 230, and/or an SEW radiation feed lines 225 and/or 315 as described with reference to FIGS. 2 and 3.

It should be noted that the methods described herein describe possible implementations, and that the operations and the steps may be rearranged or otherwise modified and that other implementations are possible. Furthermore, aspects from two or more of the methods may be combined.

Aspect 1: A hybrid antenna structure, comprising: a helical antenna free space radiator; an SEW antenna feed point coupled to the helical antenna free space radiator; an RF switch and reflectometers configured to sense impedance at the helical antenna free space radiator and the SEW antenna feed point; and a free space radiation feed line and an SEW radiation feed line connected to the RF switch and reflectometers, the RF switch dynamically routing signals to the helical antenna free space radiator or the SEW antenna feed point in response to the sensed impedance.

Aspect 2: The hybrid antenna structure of aspect 1, further comprising an antenna ground positioned between the helical antenna free space radiator and the RF switch and reflectometers to provide a reference impedance for the free space radiation feed line and the SEW radiation feed line.

Aspect 3: The hybrid antenna structure of any of aspects 1 through 2, wherein the RF switch and reflectometers are configured to measure the S11 return loss at the helical antenna free space radiator and the SEW antenna feed point to dynamically determine the routing of signals.

Aspect 4: The hybrid antenna structure of any of aspects 1 through 3, further comprising an SMA connector coupled to the free space radiation feed line and the SEW radiation feed line to facilitate external connection to an RF feed line from a transmitter.

Aspect 5: The hybrid antenna structure of any of aspects 1 through 4, wherein the SEW radiation feed line is configured to transmit signals to the SEW antenna feed point in response to the impedance sensed by the RF switch and reflectometers indicating a low reflection coefficient at the SEW antenna feed point.

Aspect 6: The hybrid antenna structure of any of aspects 1 through 5, wherein the helical antenna free space radiator is configured to operate in response to the impedance sensed by the RF switch and reflectometers indicating a low reflection coefficient at the helical antenna free space radiator.

Aspect 7: The hybrid antenna structure of any of aspects 1 through 6, wherein the RF switch and reflectometers are configured to dynamically alternate signal routing between the free space radiation feed line and the SEW radiation feed line based on the impedance sensed at the helical antenna free space radiator and the SEW antenna feed point.

Aspect 8: The hybrid antenna structure of any of aspects 1 through 7, wherein the SEW radiation feed line is configured to transmit signals to the SEW antenna feed point in response to the RF switch and reflectometers detecting a high reflection coefficient at the helical antenna free space radiator.

Aspect 9: The hybrid antenna structure of any of aspects 1 through 8, wherein the RF switch is configured to isolate the free space radiation feed line from the SEW radiation feed line during signal transmission to prevent interference between the helical antenna free space radiator and the SEW antenna feed point.

Aspect 10: The hybrid antenna structure of any of aspects 1 through 9, wherein the RF switch and reflectometers are configured to sense impedance variations caused by proximity to metallic surfaces and dynamically adjust signal routing from the helical antenna free space radiator to the SEW antenna feed point.

Aspect 11: The hybrid antenna structure of any of aspects 1 through 10, wherein the SMA connector is configured to provide a detachable interface for connecting the free space radiation feed line and the SEW radiation feed line to an external RF feed line from a transmitter.

Aspect 12: The hybrid antenna structure of any of aspects 1 through 11, wherein the helical antenna free space radiator is configured to radiate signals in response to the RF switch and reflectometers detecting a low reflection coefficient at the free space radiation feed line.

Aspect 13: The hybrid antenna structure of any of aspects 1 through 12, wherein the RF switch and reflectometers are configured to dynamically sense and route signals to the SEW antenna feed point in response to environmental conditions affecting the impedance at the helical antenna free space radiator.

Aspect 14: A method of manufacturing a hybrid antenna structure, comprising: providing a helical antenna free space radiator; coupling an SEW antenna feed point to the helical antenna free space radiator; configuring an RF switch and reflectometers to sense impedance at the helical antenna free space radiator and the SEW antenna feed point; and connecting a free space radiation feed line and an SEW radiation feed line to the RF switch and reflectometers, wherein the RF switch dynamically routes signals to the helical antenna free space radiator or the SEW antenna feed point in response to the sensed impedance.

Aspect 15: The method of aspect 14, further comprising positioning an antenna ground between the helical antenna free space radiator and the RF switch and reflectometers to provide a reference impedance for the free space radiation feed line and the SEW radiation feed line.

Aspect 16: The method of any of aspects 14 through 15, wherein the RF switch and reflectometers are configured to measure the S11 return loss at the helical antenna free space radiator and the SEW antenna feed point to dynamically determine the routing of signals.

Aspect 17: The method of any of aspects 14 through 16, further comprising coupling an SMA connector to the free space radiation feed line and the SEW radiation feed line to facilitate external connection to an RF feed line from a transmitter.

Aspect 18: The method of any of aspects 14 through 17, wherein the SEW radiation feed line is configured to transmit signals to the SEW antenna feed point in response to the impedance sensed by the RF switch and reflectometers indicating a low reflection coefficient at the SEW antenna feed point.

Aspect 19: The method of any of aspects 14 through 18, wherein the helical antenna free space radiator is configured to operate in response to the impedance sensed by the RF switch and reflectometers indicating a low reflection coefficient at the helical antenna free space radiator.

Aspect 20: A kit, comprising: a helical antenna free space radiator; an SEW antenna feed point coupled to the helical antenna free space radiator; an RF switch and reflectometers configured to sense impedance at the helical antenna free space radiator and the SEW antenna feed point; and a free space radiation feed line and an SEW radiation feed line connected to the RF switch and reflectometers, the RF switch dynamically routing signals to the helical antenna free space radiator or the SEW antenna feed point in response to the sensed impedance.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A hybrid antenna structure, comprising:

a helical antenna free space radiator;

a surface electromagnetic wave (SEW) antenna feed point coupled to the helical antenna free space radiator;

an RF switch and reflectometers configured to sense impedance at the helical antenna free space radiator and the SEW antenna feed point; and a free space radiation feed line and an SEW radiation feed line connected to the RF switch and the reflectometers, the RF switch dynamically routing signals to the helical antenna free space radiator or the SEW antenna feed point in response to the impedance.

2. The hybrid antenna structure of claim 1, further comprising an antenna ground positioned between the helical antenna free space radiator, the RF switch, and the reflectometers to provide a reference impedance for the free space radiation feed line and the SEW radiation feed line.

3. The hybrid antenna structure of claim 1, wherein the RF switch and the reflectometers are configured to measure an S11 return loss at the helical antenna free space radiator and the SEW antenna feed point to dynamically determine the routing of the signals.

4. The hybrid antenna structure of claim 1, further comprising an SMA connector coupled to the free space radiation feed line and the SEW radiation feed line to facilitate external connection to an RF feed line from a transmitter.

5. The hybrid antenna structure of claim 1, wherein the SEW radiation feed line is configured to transmit the signals to the SEW antenna feed point in response to the impedance sensed by the RF switch and the reflectometers indicating a low reflection coefficient at the SEW antenna feed point.

6. The hybrid antenna structure of claim 1, wherein the helical antenna free space radiator is configured to operate in response to the impedance sensed by the RF switch and the reflectometers indicating a low reflection coefficient at the helical antenna free space radiator.

7. The hybrid antenna structure of claim 1, wherein the RF switch and the reflectometers are configured to dynamically alternate signal routing between the free space radiation feed line and the SEW radiation feed line based on the impedance sensed at the helical antenna free space radiator and the SEW antenna feed point.

8. The hybrid antenna structure of claim 1, wherein the SEW radiation feed line is configured to transmit the signals to the SEW antenna feed point in response to the RF switch and the reflectometers detecting a high reflection coefficient at the helical antenna free space radiator.

9. The hybrid antenna structure of claim 1, wherein the RF switch is configured to isolate the free space radiation feed line from the SEW radiation feed line during signal transmission to prevent interference between the helical antenna free space radiator and the SEW antenna feed point.

10. The hybrid antenna structure of claim 1, wherein the RF switch and the reflectometers are configured to sense the impedance variations caused by proximity to metallic surfaces and dynamically adjust the routing of the signals to the helical antenna free space radiator or the SEW antenna feed point.

11. The hybrid antenna structure of claim 4, wherein the SMA connector is configured to provide a detachable interface for connecting the free space radiation feed line and the SEW radiation feed line to an external RF feed line from the transmitter.

12. The hybrid antenna structure of claim 1, wherein the helical antenna free space radiator is configured to radiate the signals in response to the RF switch and the reflectometers detecting a low reflection coefficient at the free space radiation feed line.

13. The hybrid antenna structure of claim 1, wherein the RF switch and the reflectometers are configured to dynamically sense and route the signals to the SEW antenna feed point in response to environmental conditions affecting the impedance at the helical antenna free space radiator.

14. A method of manufacturing a hybrid antenna structure, comprising:

providing a helical antenna free space radiator;

coupling a surface electromagnetic wave (SEW) antenna feed point to the helical antenna free space radiator;

configuring an RF switch and reflectometers to sense impedance at the helical antenna free space radiator and the SEW antenna feed point; and connecting a free space radiation feed line and an SEW radiation feed line to the RF switch and the reflectometers, wherein the RF switch dynamically routes signals to the helical antenna free space radiator or the SEW antenna feed point in response to the impedance.

15. The method of manufacturing a hybrid antenna structure of claim 14, further comprising positioning an antenna ground between the helical antenna free space radiator, the RF switch, and the reflectometers to provide a reference impedance for the free space radiation feed line and the SEW radiation feed line.

16. The method of manufacturing a hybrid antenna structure of claim 14, wherein the RF switch and the reflectometers are configured to measure an S11 return loss at the helical antenna free space radiator and the SEW antenna feed point to dynamically determine the routing of the signals.

17. The method of manufacturing a hybrid antenna structure of claim 14, further comprising coupling an SMA connector to the free space radiation feed line and the SEW radiation feed line to facilitate external connection to an RF feed line from a transmitter.

18. The method of manufacturing a hybrid antenna structure of claim 14, wherein the SEW radiation feed line is configured to transmit the signals to the SEW antenna feed point in response to the impedance sensed by the RF switch and the reflectometers indicating a low reflection coefficient at the SEW antenna feed point.

19. The method of manufacturing a hybrid antenna structure of claim 14, wherein the helical antenna free space radiator is configured to operate in response to the impedance sensed by the RF switch and the reflectometers indicating a low reflection coefficient at the helical antenna free space radiator.

20. A kit, comprising:

a helical antenna free space radiator;

a surface electromagnetic wave (SEW) antenna feed point coupled to the helical antenna free space radiator;

an RF switch and reflectometers configured to sense impedance at the helical antenna free space radiator and the SEW antenna feed point; and a free space radiation feed line and an SEW radiation feed line connected to the RF switch and the reflectometers, the RF switch dynamically routing signals to the helical antenna free space radiator or the SEW antenna feed point in response to the impedance.

* * * * *